US012566271B2

(12) United States Patent
Yoneji

(10) Patent No.: US 12,566,271 B2
(45) Date of Patent: Mar. 3, 2026

(54) MOVEMENT AMOUNT ESTIMATION DEVICE, MOVEMENT AMOUNT ESTIMATION METHOD, MOVEMENT AMOUNT ESTIMATION PROGRAM, AND MOVEMENT AMOUNT ESTIMATION SYSTEM

(71) Applicant: DENSO CORPORATION, Kariya-city (JP)

(72) Inventor: Kenichi Yoneji, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 983 days.

(21) Appl. No.: 17/660,584

(22) Filed: Apr. 25, 2022

(65) Prior Publication Data

US 2022/0244394 A1      Aug. 4, 2022

Related U.S. Application Data

(63) Continuation of application No. PCT/JP2020/033068, filed on Sep. 1, 2020.

(30) Foreign Application Priority Data

Oct. 28, 2019     (JP) ................................. 2019-195548

(51) Int. Cl.
| | |
|---|---|
| *G01S 17/894* | (2020.01) |
| *G06T 7/00* | (2017.01) |
| *H04N 23/74* | (2023.01) |

(52) U.S. Cl.
CPC .......... *G01S 17/894* (2020.01); *G06T 7/0002* (2013.01); *H04N 23/74* (2023.01); *G06T 2207/10028* (2013.01)

(58) Field of Classification Search
CPC ...... G01S 17/894; G01S 17/86; G01S 17/931; G01S 17/89; G01S 17/87; G06T 7/0002;
(Continued)

(56) References Cited

U.S. PATENT DOCUMENTS

| | | | |
|---|---|---|---|
| 8,027,029 B2 * | 9/2011 | Lu ......................... | G01S 7/4817 |
| | | | 356/28 |
| 10,491,885 B1 * | 11/2019 | Hicks ..................... | G06V 20/56 |

(Continued)

FOREIGN PATENT DOCUMENTS

| | | | | |
|---|---|---|---|---|
| CN | 108319976 A | * | 7/2018 | .......... G05D 1/0231 |
| CN | 110058263 A | | 7/2019 | |

(Continued)

OTHER PUBLICATIONS

CN-108319976-A English translation.*
WO-2019026438-A1 English Translation.*

*Primary Examiner* — Assres H Woldemaryam
(74) *Attorney, Agent, or Firm* — Maschoff Brennan

(57) ABSTRACT

A movement amount estimation device includes an image acquiring unit and an estimation unit. The image acquiring unit is configured to acquire a reflected light image, a background light image, and a camera image. The reflected light image contains distance information obtained by emitting light and detecting the light reflected from an object by a light receiving element. The background light image contains luminance information obtained by detecting background light relative to the light reflected from the object by the light receiving element. The camera image is captured by a camera element that is different from the light receiving element. The estimation unit is configured to estimate a movement amount of an estimation target using information of a captured object commonly detected in the reflected light image, the background light image, and the camera image.

10 Claims, 7 Drawing Sheets

(58) Field of Classification Search
CPC .......... G06T 2207/10028; H04N 23/74; H04N
23/61
See application file for complete search history.

(56) References Cited

U.S. PATENT DOCUMENTS

| | | | | | |
|---|---|---|---|---|---|
| 2007/0073484 | A1* | 3/2007 | Horibe | .................. | G08G 1/166 |
| | | | | | 382/104 |
| 2013/0335535 | A1* | 12/2013 | Kane | ................. | G01B 11/2513 |
| | | | | | 348/50 |
| 2013/0336577 | A1* | 12/2013 | Lu | ........................ | H04N 13/261 |
| | | | | | 382/154 |
| 2016/0259057 | A1* | 9/2016 | Ito | ......................... | G01S 7/4865 |
| 2017/0132934 | A1* | 5/2017 | Kentley | ............... | G05D 1/0088 |
| 2017/0272651 | A1 | 9/2017 | Mathy et al. | | |
| 2019/0033452 | A1 | 1/2019 | Ito | | |
| 2021/0403015 | A1* | 12/2021 | Kato | .................... | B60W 40/02 |
| 2022/0201164 | A1* | 6/2022 | Tsukada | ............... | H04N 5/2226 |

FOREIGN PATENT DOCUMENTS

| | | | | | |
|---|---|---|---|---|---|
| EP | 3 664 064 | A1 | 6/2020 | | |
| JP | 2019-128705 | A | 8/2019 | | |
| JP | 2021-068389 | A | 4/2021 | | |
| WO | WO-2019026438 | A1 * | 2/2019 | ........... | B60W 40/02 |

* cited by examiner

TIME T2, Te

STc

STs    ET, A

ET, A    10

ET, A    TIME T3, Tf

ΔR1 , Δt1

20

ΔR2 , Δt2

10

STs

TIME T1, Tf

MOVING BODY POSITION : t(x, y, z)
MOVING BODY MOVEMENT : R(roll, pitch, yaw)

TIMING FOR CAPTURING
BACKGROUND LIGHT IMAGE AND
REFLECTED LIGHT IMAGE : STs

TIMING FOR CAPTURING
CAMERA IMAGE : STc

FIG. 5

TIMING FOR CAPTURING
BACKGROUND LIGHT IMAGE AND
REFLECTED LIGHT IMAGE : STs

TIMING FOR CAPTURING CAMERA IMAGE : STc

MOVING BODY POSITION : t(x, y, z)
MOVING BODY MOVEMENT : R(roll, pitch, yaw)

MOVEMENT AMOUNT ESTIMATION DEVICE, MOVEMENT AMOUNT ESTIMATION METHOD, MOVEMENT AMOUNT ESTIMATION PROGRAM, AND MOVEMENT AMOUNT ESTIMATION SYSTEM

CROSS REFERENCE TO RELATED APPLICATION

The present application is a continuation application of International Patent Application No. PCT/JP2020/033068 filed on Sep. 1, 2020, which designated the U.S. and claims the benefit of priority from Japanese Patent Application No. 2019-195548 filed on Oct. 28, 2019. The entire disclosures of all of the above applications are incorporated herein by reference.

TECHNICAL FIELD

The present disclosure relates to a movement amount estimation technique.

BACKGROUND

A general self-position estimation device in which LiDAR (Light Detection and Ranging) is used as a distance sensor is known. The LiDAR is mounted in a moving body configured to autonomously move to measure the distance to object around the moving body. The self-position estimation device is configured to estimate the moving amount and the position of the moving body using the measurement information detected by the LiDAR.

SUMMARY

According to a first aspect of the present disclosure, a movement amount estimation device includes an image acquiring unit and an estimation unit. The image acquiring unit is configured to acquire a reflected light image, a background light image, and a camera image. The reflected light image contains distance information obtained by emitting light and detecting the light reflected from an object by a light receiving element. The background light image contains luminance information obtained by detecting background light relative to the light reflected from the object by the light receiving element. The camera image is captured by a camera element that is different from the light receiving element. The estimation unit is configured to estimate a movement amount of an estimation target using information of a captured object commonly detected in the reflected light image, the background light image, and the camera image.

According to a second aspect of the present disclosure, a method for estimating a movement amount includes acquiring a reflected light image, a background light image, and a camera image. The reflected light image contains distance information obtained by emitting light and detecting the light reflected from an object by a light receiving element. The background light image contains luminance information obtained by detecting background light relative to the light reflected from the object by the light receiving element. The camera image is captured by a camera element that is different from the light receiving element. The method includes estimating the movement amount of an estimation target using information of a captured object commonly detected in the reflected light image, the background light image, and the camera image.

According to a third aspect of the present disclosure, a computer program product includes instructions configured to, when executed by at least one processor, cause the at least one processor to acquire a reflected light image, a background light image, and a camera image. The reflected light image contains distance information obtained by emitting light and detecting the light reflected from an object by a light receiving element. The background light image contains luminance information obtained by detecting background light relative to the light reflected from the object by the light receiving element. The camera image is captured by a camera element that is different from the light receiving element. The instructions is configured to, when executed by at least one processor, cause the at least one processor to estimate the movement amount of an estimation target using information of a captured object commonly detected in the reflected light image, the background light image, and the camera image.

According to a fourth aspect of the present disclosure, a movement amount estimation system includes a distance measuring device, a camera device, and a computing device. The distance measuring device is configured to generate a reflected light image containing distance information obtained by emitting light and detecting the light reflected from an object by a light receiving element, and a background light image containing luminance information obtained by detecting background light relative to the light reflected from the object by the light receiving element. The computing device is configured to estimate a movement amount of an estimation target using information of a captured object commonly detected in the reflected light image, the background light image, and the camera image.

BRIEF DESCRIPTION OF THE DRAWINGS

FIG. 5 is a diagram schematically showing a process related to a movement amount estimation.

EMBODIMENTS

Comparative Example

A LiDAR of a comparative example of the present disclosure is configured to repeatedly output the detected distance information. However, the distance information output per unit time is limited. Accordingly, when the movement amount of the moving body is estimated using only the distance information, it may be difficult to secure the accuracy in the estimation of the movement amount due to the shortage of the number of frames of the distance information per unit time, i.e. frame rate.

Hereinafter, a plurality of embodiments of the present disclosure will be described with reference to the drawings.

In the following respective embodiments, corresponding structural elements are indicated by the same reference signs and may not be redundantly described in some cases. When only a part of the configuration is described in each embodiment, the configuration of the other embodiments described above can be applied to other parts of the configuration. Besides the explicitly described combination(s) of structural components in each of the following embodiments, the structural components of different embodiments may be partially combined even though such a combination(s) is not explicitly explained as long as there is no problem. Unspecified combinations of the configurations described in the plurality of embodiments and the modification examples are also disclosed in the following description.

First Embodiment

Figure 1:
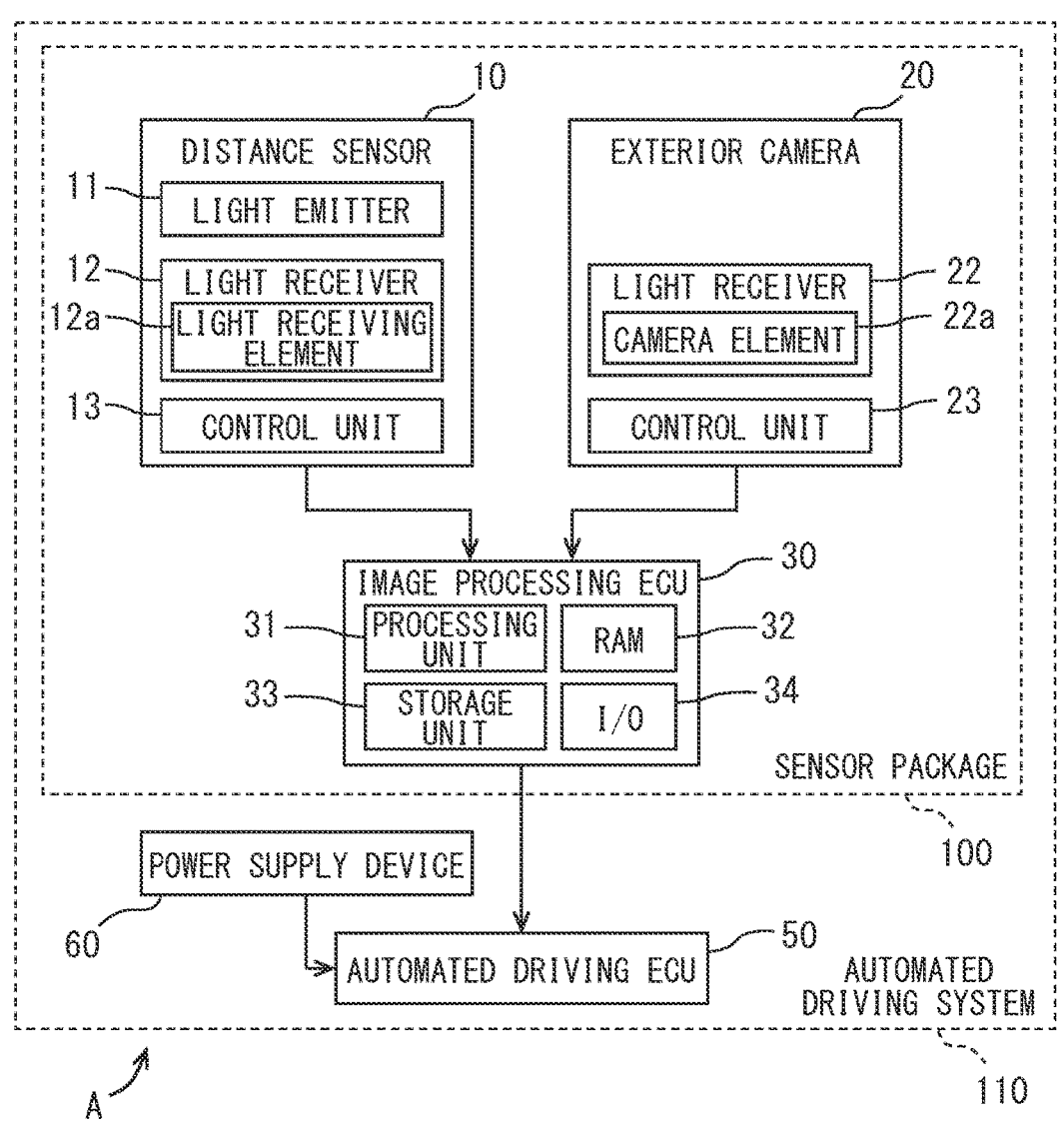
FIG. 1 is a diagram illustrating a sensor package and an automated driving system according to a first embodiment of the present disclosure.
Figure 2:
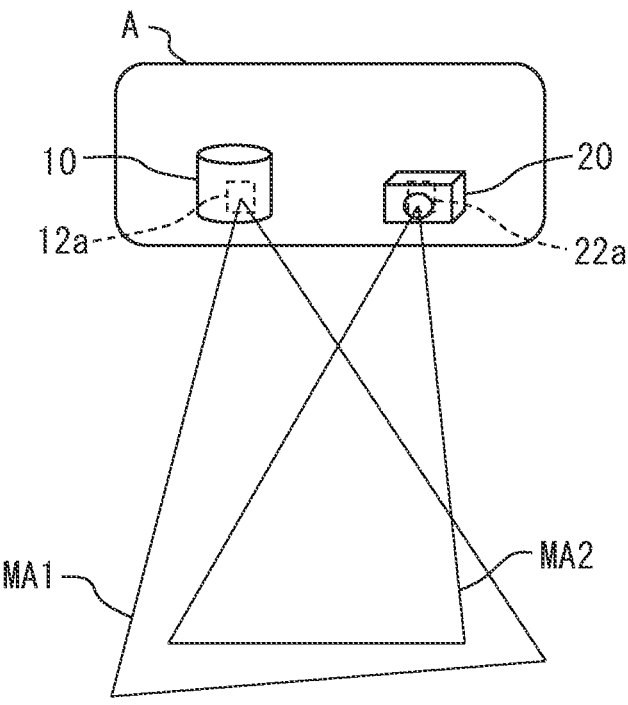
FIG. 2 is a diagram showing a distance sensor and an external camera mounted in a vehicle.

An image processing ECU (Electronic Control Unit) 30 of a first embodiment of the present disclosure shown in FIG. 1 is used in a vehicle A that is an moving body. As shown in FIGS. 1, 2, the image processing ECU 30 constitutes a sensor package 100 together with a distance sensor 10 and an external camera 20. The sensor package 100 may constitute an automated driving system 110 together with the automated driving ECU 50 and a power supply device 60, for example. In the automated driving system 110, the image processing ECU 30 and the sensor package 100 function as a movement amount estimation device and a movement amount estimation system configured to integrate measurement results by the distance sensor 10 and the external camera 20 and estimate the movement amount of the vehicle A.

Figure 3:
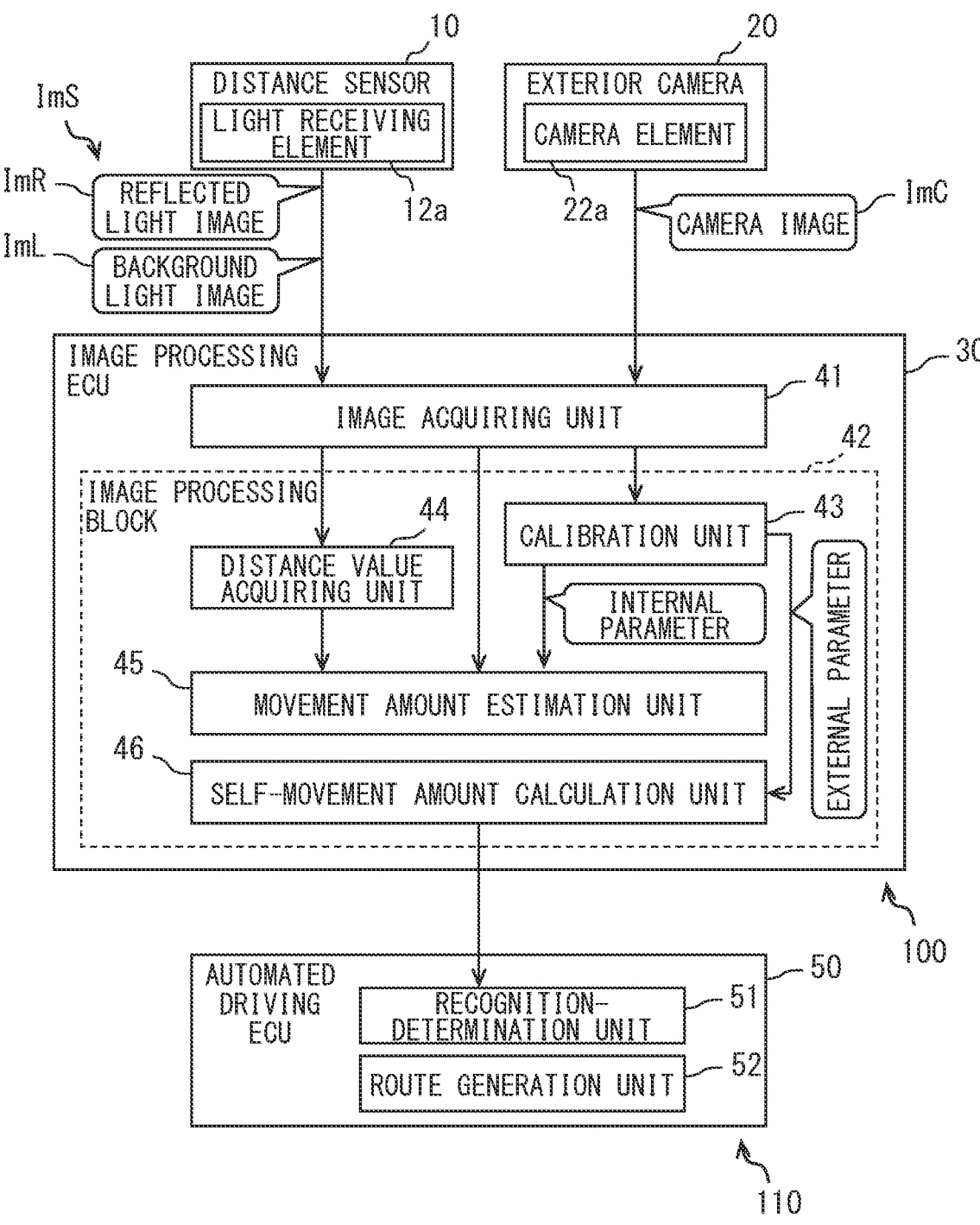
FIG. 3 is a block diagram for explaining an image processing process in an image processing ECU.

The automated driving system 110 shown in FIGS. 1, 3 is, for example, a system package that realizes autonomous driving of the vehicle A without a driver. The automated driving ECU 50, which is a main component of the automated driving system 110, is a high-speed computing device mainly including a computer equipped with a processor, a random access memory (RAM), a storage unit, an input/output interface, and a bus connecting these elements. The automated driving ECU 50 includes a recognition-determination unit 51 and a route generation unit 52 as functional units for realizing an autonomous driving. The recognition-determination unit 51 is configured to recognize a traveling environment around the vehicle A and determine next action of the vehicle A based on information provided by the sensor package 100. The route generation unit 52 is configured to generate a traveling route for driving the vehicle A based on the determination by the recognition-determination unit 51. The automated driving system 110 may be configured to provide an advanced driving assistance function to assist the driver instead of the fully automated driving function for the driverless driving.

The sensor package 100 shown in FIGS. 1-3 includes the distance sensor 10, the external camera 20, and the image processing ECU 30 as described above.

The distance sensor 10 is a SPAD (Single Photon Avalanche Diode) LiDAR, for example. The distance sensor 10 is disposed on a front end, a roof, or the like of the vehicle A. The measurement range MA1 of the distance sensor 10 includes at least the front range among the vicinity of the vehicle A.

The distance sensor 10 includes a light emitter 11, a light receiver 12, a control unit 13, and the like. The light emitter 11 emits a light beam from a light source toward the measurement range MA1 by scanning the measurement range using a movable optical member such as a polygon mirror. For example, the light source may be a semiconductor laser such as a laser diode. The light source emits, according to an electric signal provided by the control unit 13, the light beam of invisible range (e.g. near infrared region) in a pulsed form. The light beam of invisible range is invisible to occupants in the vehicle and other people outside of the vehicle.

The light receiver 12 includes a condenser lens and the light receiving element 12*a*. The condenser lens gathers the reflected light of the light beam reflected by an object in the measurement range MA1 and the background light relative to the reflected light, and controls the gathered light to enter the light receiving element 12*a*. The light receiving element 12*a* is an element configured to convert the light into an electric signal by photoelectric conversion. The light receiving element 12*a* is provided by a CMOS sensor that has a high sensitivity in the near infrared region compared with the visible region for efficiently detecting the reflected light of the light beam. The sensitivity of the light receiving element 12*a* to each wavelength range may be adjusted by an optical filter. The light receiving element 12*a* has multiple light receiving pixels arranged as an array in one-dimensional direction or two-dimensional directions. Each light receiving pixel has a configuration using SPAD, and amplifies the electrons generated by the incident of photons by avalanche multiplication, thereby enabling highly sensitive photodetection.

The control unit 13 controls operations of the light emitter 11 and the light receiver 12. The control unit 13 is disposed on the same substrate as the light receiving element 12*a*, for example. The control unit 13 is mainly composed of a processor in a broad sense such as a microcontroller or an FPGA (Field-Programmable Gate Array). The control unit 13 has a scanning control function, a reflected light measuring function, and a background light measuring function.

The scanning control function is a function for controlling scanning of light beam by the light emitter 11. The control unit 13 oscillates the light beam emitted from the light source multiple times to have a pulse shape based on an operating clock of a clock oscillator included in the distance sensor 10. The control unit 13 is configured to operate the movable optical member in synchronization with the emission of the light beam.

The reflected light measuring function is a function of reading out, according to the scan timing of the light beam, a voltage value corresponding to the reflected light received by each light receiving pixel, and measuring an intensity of the reflected light. The control unit 13 is configured to sense the arrival time of the reflected light based on the timing when a peak appears in the output pulse of the light receiving element 12*a*. The control unit 13 is configured to measure the flight time of the light (Time of Flight) by measuring the time difference between the time when the light beam is emitted from the light source and the time when the reflected light arrives.

By the cooperation of the above scanning control function and the reflected light measuring function, the reflected light image ImR, which is image-like data, is generated. The control unit 13 measures the reflected light by the rolling shutter method to generate the reflected light image ImR. Specifically, the control unit 13 generates, according to the scanning of the light beam in a horizontal direction, information of pixel group aligned in a transverse direction on an imaging plane corresponding to the measurement range MA1, one or more lines at a time. The control unit 13 generates one reflected light image ImR by longitudinally synthesizing the sequentially generated information of pixel group.

The reflected light image ImR is an image data containing distance information acquired by detecting (sensing) the reflected light of the light emitted from the light emitter 11 by the light receiving element 12a. The value indicating the flight time of the light is contained in each pixel of the reflected light image ImR. The value indicating the flight time of the light is a distance value indicating a distance from the distance sensor 10 to a reflection point of an object in the measurement range MA1. The value indicating the intensity of the reflected light is contained in each pixel of the reflected light image ImR. That is, the reflected light image ImR is an image data representing a luminance distribution of the reflected light.

The background light measurement function is a function of reading out a voltage value corresponding to the background light received by each light receiving pixel at a time point immediately before measuring of the reflected light, and measuring the intensity of the background light. Here, the background light is incident light entering the light receiving element 12a from the measurement range MA1 among the external area, and does not include the reflected light. The incident light includes natural light, light from an external display, and the like. Similar to the reflected light image ImR, the control unit 13 measures the background light by the rolling shutter method and generates the background light image ImL. The background light image ImL is an image data representing the luminance distribution of the background light before emitting the light, and contains the luminance information of the background light detected by the light receiving element 12a. That is, the value of each pixel arranged tow-dimensionally in the background light image ImL is a luminance value indicating the intensity of the background light at the corresponding potion of the measurement range MA1.

The reflected light image ImR and the background light image ImL are sensed by the same light receiving element 12a, and acquired from the same optical system including the light receiving element 12a. Therefore, the coordinate system of the reflected light image ImR can be regarded as the same and coincident coordinate system as the coordinate system of the background light image ImL. Furthermore, there is almost no difference between the measurement time of the reflected light image ImR and the measurement time of the background light image ImL. For example, the time difference may be less than 1 nanosecond. Therefore, a set of successively acquired reflected light image ImR and background light image ImL can be regarded as being synchronized. In addition, the pixels of the reflected light image ImR and the background light image ImL can uniquely correspond to each other. The reflected light image ImR and the background light image ImL are successively output to the image processing ECU 30 as image data in which three data channels including the intensity of the reflected light, the distance to the object, and the intensity of the background light are stored for each pixel. The reflected light image ImR and the background light image ImL associated with each other may be referred to as a sensor image ImS.

The external camera 20 may be arranged in a passenger compartment close to a front windshield of the vehicle A. The external camera 20 is configured to capture a measurement range MA2 including at least the front range in the outside of the vehicle A. The measurement range MA2 of the external camera 20 is set to overlap at least a part of the measurement range MA1 of the distance sensor 10.

The external camera 20 includes a light receiver 22 and a control unit 23. The light receiver 22 collects incident light (background light) from the measurement range MA2 of external area by, for example, a light receiving lens, and controls the collected light to enter a camera element 22a.

The camera element 22a is an element configured to convert the light into an electric signal by photoelectric conversion and has different configurations than the light receiving element 12a of the distance sensor 10. A CCD sensor, a CMOS sensor, or the like can be used as for the camera element 22a. The camera element 22a is set to have high sensitivity in the visible region compared with the near infrared region in order to efficiently receive natural light in the visible region. The camera element 22a has multiple light receiving pixels two-dimensionally arranged as an array. The light receiving pixels of the camera element 22a corresponds to so-called sub-pixels. For example, red, green, and blue color filters may be arranged on the light receiving pixels adjacent to one another. Each light receiving pixel receives visible light of a color corresponding to the arranged color filter. The camera element 22a is configured to capture a camera image ImC by measuring red color intensity, green color intensity, and blue color intensity by the light receiving pixels. The camera image ImC is a visible color image with higher resolution than the reflected light image ImR and the background light image ImL.

The control unit 23 controls operations of the light receiver 22. For example, the control unit 23 may be arranged on a common substrate together with the camera element 22a, and mainly includes a broad-meaning processor, such as a microcomputer or a FPGA. The control unit 23 has an image capturing function.

The image capturing function is a function for capturing a color image as described above. The control unit 23 reads out, according to an operating clock of a clock oscillator included in the external camera 20, a voltage value corresponding to the incident light received by each light receiving pixel. This clock oscillator of the external camera 20 is provided independently of the clock oscillator of the distance sensor 10. The control unit 23 is configured to measure, by the camera element 22a, the background light substantially at the same time by all light receiving pixels in the global shutter mode to generate the camera image ImC which is image-like data.

The camera image ImC is an image representing a luminance distribution of the visible background light sensed by the camera element 22a. The luminance distribution is a gradation value of the intensity distribution of the corresponding light (the reflected light, the background light, the light in the visible region, or the light in the invisible region). That is, the value of each pixel arranged two-dimensionally in the camera image ImC is the luminance value indicating the intensity of the incident light of each color incident on the camera element 22a from the measurement range MA2. Such camera images ImC are successively output to the image processing ECU 30.

The image processing ECU 30 is an electronic control unit mainly includes a computing circuit equipped with a processing unit 31, a RAM 32, a storage unit 33, an input/output interface 34, and a bus connecting these elements. The processing unit 31 is coupled with the RAM 32, and is provided by a hardware for executing an arithmetic processing. The processing unit 31 includes at least one calculation core, such as a central processing unit (CPU), a Graphical Processing Unit (GPU), and a FPGA. The processing unit 31 may be an image processing chip including an IP core or the like having another dedicated function. The image processing chip may be an ASIC (Application Specific Integrated Circuit) designed for the automated driving. The processing unit 31 executes, by accessing the RAM 32, various processes for functioning as the functional blocks described later. The storage unit 33 includes a non-volatile storage medium. The storage unit 33 stores various programs (movement amount estimation program, etc.) to be executed by the processing unit 31.

The image processing ECU 30 is configured to process the image information from the distance sensor 10 and the external camera 20 to generate information to be provided to the automated driving ECU 50. The information generated by the image processing ECU 30 contains the estimation result of the movement amount of the vehicle A (hereinafter, referred to as a self-movement amount) in which the sensor package 100 is mounted. The image processing ECU 30 is configured to execute the movement amount estimation program for estimating the self-movement amount stored in the storage unit 33 by the processing unit 31 to have functional units such as an image acquiring unit 41, a calibration unit 43, a distance value acquiring unit 44, a movement amount estimation unit 45, a self-movement amount calculation unit 46, and the like. The calibration unit 43, the distance value acquiring unit 44, the movement amount estimation unit 45, and the self-movement amount calculation unit 46 are an image processing block 42 for performing an image processing.

The image acquiring unit 41 is configured to acquire the reflected light image ImR and the background light image ImL from the distance sensor 10. The image acquiring unit 41 is configured to acquire the camera image ImC from the external camera 20. In the first embodiment, the frame rate of the reflected light image ImR and the background light image ImL is substantially the same as the frame rate of the camera image ImC. In contrast, the capturing timing STs for the reflected light image ImR and the background light image ImL by the distance sensor 10 is different from the capturing timing STc for the camera image ImC by the external camera 20. Accordingly, the capturing timing STs for the reflected light image ImR and the background light image ImL and the capturing timing STc for the camera image ImC arrive alternately (see FIG. 4). As a result, the image acquiring unit 41 acquires (i) the reflected light image ImR and the background light image ImL, and (ii) the camera image ImC alternately.

Hereinafter, the detection period when the light receiving element 12*a* performs the detection for generating the reflected light image ImR and the background light image ImL is referred to as a frame period, and a start timing of the frame period is referred to as a shutter start timing Tf for the reflected light image ImR and the background light image ImL. A start timing of an exposure period when the camera element 22*a* performs the exposure for capturing the camera image ImC is referred to as a shutter start timing Te for the camera image ImC.

The background light image ImL and the reflected light image ImR start being captured at the shutter start timing Tf (see the time T1, T3 shown in FIG. 4) substantially at the same time (almost no time difference). In contrast, the shutter start timing Te (see the time T2 shown in FIG. 4) for the camera image ImC is offset from the shutter start timing Tf for the background light image ImL and the reflected light image ImR.

In addition, the entire frame period of the light receiving element 12*a* is offset from the entire exposure period of the camera element 22*a*. That is, the exposure period of the camera element 22*a* starts after the frame period of the light receiving element 12*a* ends. After the exposure period ends, next frame period of the light receiving element 12*a* starts. Accordingly, the image acquiring unit 41 acquires the image data alternately from the distance sensor 10 and the external camera 20. For example, the image acquiring unit 41 acquires, in order, the background light image ImL and the reflected light image ImR for the time T1, the camera image ImC for the time T2, the background light image ImL and the reflected light image ImR for the time T3, and so on.

Figure 4:
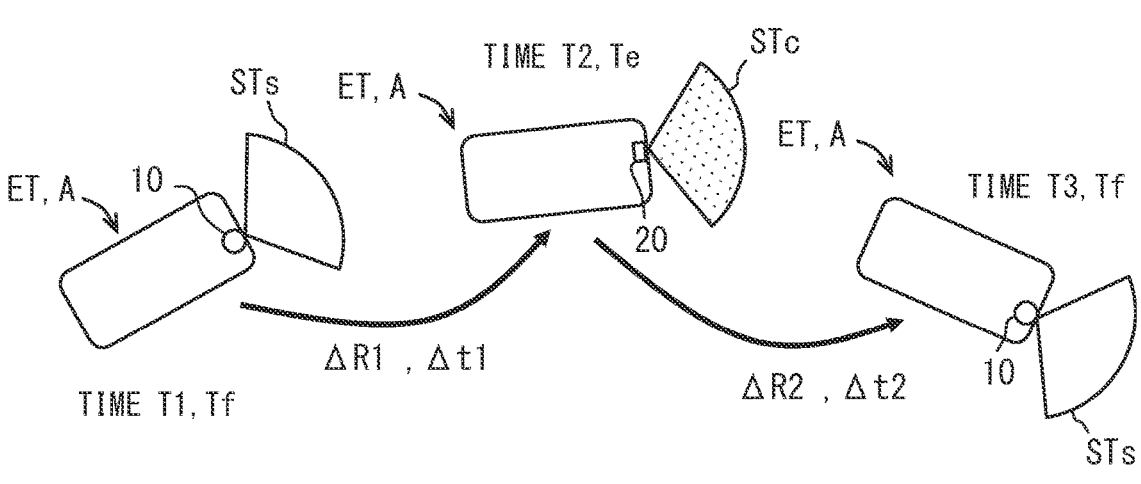
FIG. 4 is a diagram illustrating an example of a timing for capturing an sensor image and a camera image.
Figure 4:
Figure 4:

As shown in FIG. 4, the state of the vehicle A is defined by six coordinate information including coordinate information R (roll, pitch, yaw) of the rotating system indicating the posture of the moving body and coordinate information t (x, y, z) of the translational system indicating the position of the moving body. The posture change ΔR1 and the position change Δt1 occur in the vehicle A during the period between the time T1 and the time T2. Similarly, the posture change ΔR2 and the position change Δt2 occur in the vehicle A during the period between the time T2 and the time T3. The differences (ΔR1, ΔR2, Δt1, Δt2) between the times correspond to the movement amount of the vehicle A estimated by the image processing ECU 30 shown in FIGS. 1, 3.

The calibration unit 43 is configured to set the internal parameters of the distance sensor 10, the internal parameters of the external camera 20, and the external parameters between the distance sensor 10 and the external camera 20. The calibration unit 43 is configured to read out the preset parameters from the storage unit 33 and set them to specific storage spaces in the RAM 32. The internal parameters prepared on the RAM 32 are referred by the movement amount estimation unit 45. In contrast, the external parameters are referred by the self-movement amount calculation unit 46.

Figure 5:
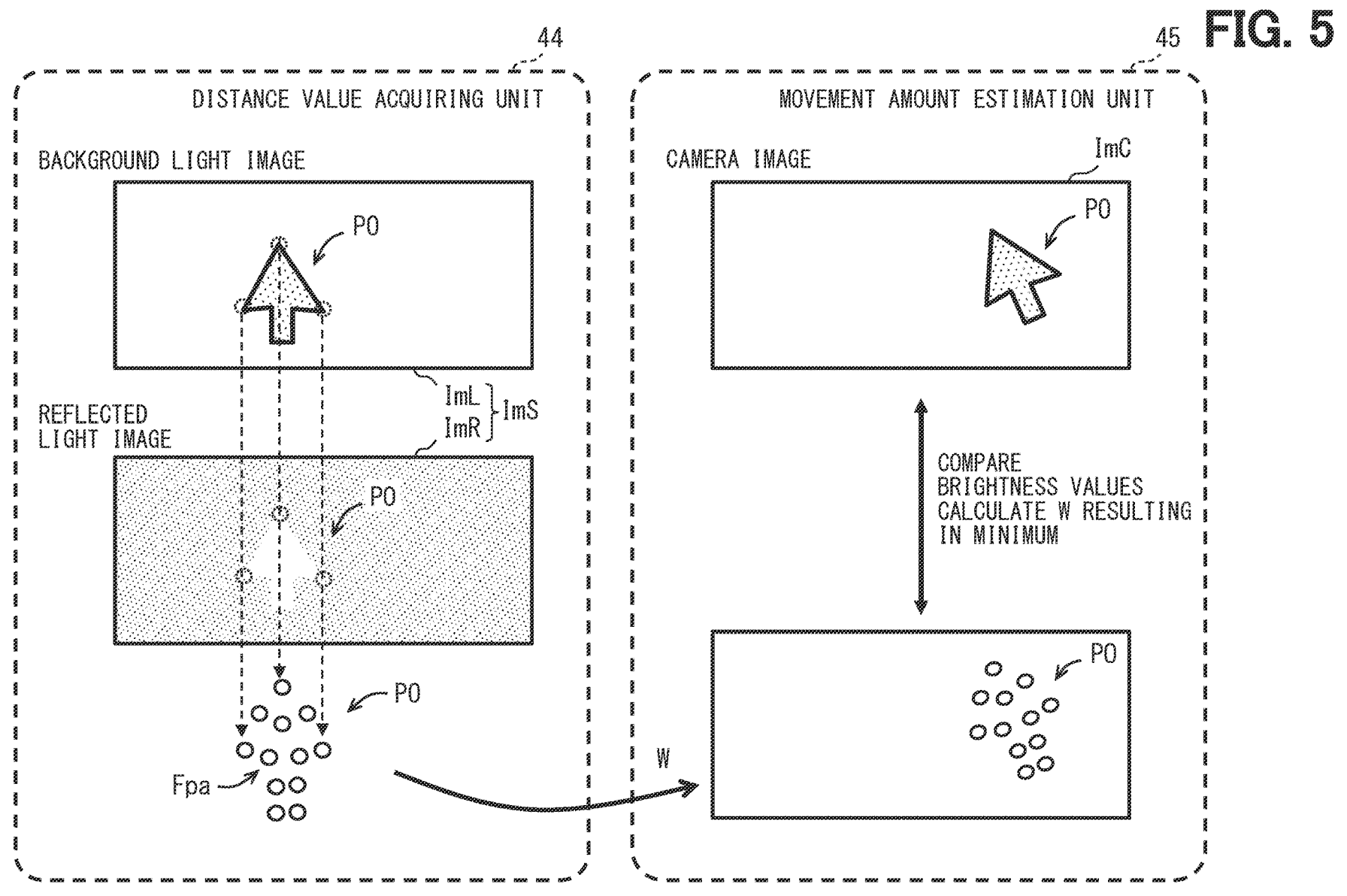

The distance value acquiring unit 44 shown in FIGS. 3, 5 is configured to refer the reflected light image ImR and the background light image ImL constituting one sensor image ImS, and prepare sensor element information using the images ImR, ImL. Specifically, the distance value acquiring unit 44 acquires the distance values of the reflected light image ImR each of which corresponds to each pixel position of the background light image ImL. The distance value acquiring unit 44 is configured to identify a captured object PO commonly captured in the reflected light image ImR and the background light image ImL based on the degree of the change (gradient) of the luminance values and the distance values of the adjacent pixels in the images. The distance value acquiring unit 44 is configured to set, as a feature point Fpa, a pixel in the background light image ImL corresponding to a pixel in the reflected light image ImR at which the intensity of the reflected light is a certain value or more. The distance value acquiring unit 44 is configured to use, as the sensor element information, the distance values and the luminance values of the feature point Fpa and the pixels around the feature point Fpa related to the captured object PO.

The movement amount estimation unit 45 is configured to estimate the movement amount of an estimation target ET using the information of the captured object PO commonly detected in the reflected light image ImR, the background light image ImL, and the camera image ImC. Specifically, the movement amount estimation unit 45 is configured to track the feature points Fpa and the pixels around the feature points Fpa related to the captured object PO in the successively captured sensor image ImS and the camera image ImC, and calculate the motion vector of the captured object PO. It may be desirable that the captured object PO is a stationary three-dimensional structure. When the captured object PO is a stationary object, it is easy to estimate the movement amount of the vehicle A from the movement amount of the captured object PO in the image.

Specifically, the movement amount estimation unit 45 is configured to identify the captured object PO commonly captured in the sensor image ImS and the camera image ImC, and prepare, as the camera element information, the luminance values of the pixels related to the captured object PO. The movement amount estimation unit 45 is configured to convert the sensor element information prepared by the distance value acquiring unit 44 to information that can be directly compared with the camera element information for performing the process in which the sensor image ImS and the camera image ImC are considered as successive frame images. The movement amount estimation unit 45 is configured to adjust the difference of the resolutions between the sensor image ImS and the camera image ImC, and the difference of the intensities of the background light (difference in the luminance) between the visible region and the infrared region. The movement amount estimation unit 45 is configured to compare the luminance value in the camera element information and the luminance value in the sensor element information using the camera element information as the reference. For example, the movement amount estimation unit 45 is configured to calculate $\Delta R$ and $\Delta t$ which minimize the left side of the following formula 1 using Lucas-Kanade method.

$$C(\Delta R, \Delta t) = \|W(I\_spad, d\_spad) - I\_image\|^2 \qquad \text{(Formula 1)}$$

In the above formula 1, 'W' represents a conversion function determined by $\Delta R$, $\Delta t$, and the internal parameters of the external camera 20. The conversion function W is a function for applying general conversion to the image such as rotation, translation, and perspective projection (transformation). 'I_spad' represents the luminance value of the background light image ImL, 'd_spad' represents the distance value of the reflected light image ImR, and 'I_image' represents the luminance value of the camera image ImC. The movement amount estimation unit 45 is configured to estimate the rotational movement amount $\Delta R$ and the translational movement amount $\Delta t$ of the captured object PO in a minute time based on the above formula 1.

The self-movement amount calculation unit 46 is configured to perform process for eliminating the external parameters from the movement amounts $\Delta R$, $\Delta t$ estimated by the movement amount estimation unit 45, and calculate the rotational movement amount $\Delta R\_ego$ and the translational movement amount $\Delta t\_ego$ of the vehicle A which is the estimation target ET. Specifically, the self-movement amount calculation unit 46 is configured to acquire, as the external parameters between the distance sensor 10 and the external camera 20, R_cam corresponding to the difference in the posture of the distance sensor 10 and the external camera 20, and t_cam corresponding to the difference in the position of the distance sensor 10 and the external camera 20. The self-movement amount calculation unit 46 is configured to calculate the self-movement amounts $\Delta R\_ego$, $\Delta t\_ego$ by applying the movement amounts $\Delta R$, $\Delta t$, and the external parameters R_cam, t_cam to the following formula 2. The self-movement amount calculation unit 46 is configured to successively output the calculated self-movement amounts $\Delta R\_ego$, $\Delta t\_ego$ to the automated driving ECU 50.

$$\Delta R\_ego = R\_cam \cdot \Delta R \qquad \text{(Formula 2)}$$

$$\Delta t\_ego = R\_cam \cdot \Delta t + t\_cam$$

Figure 6:
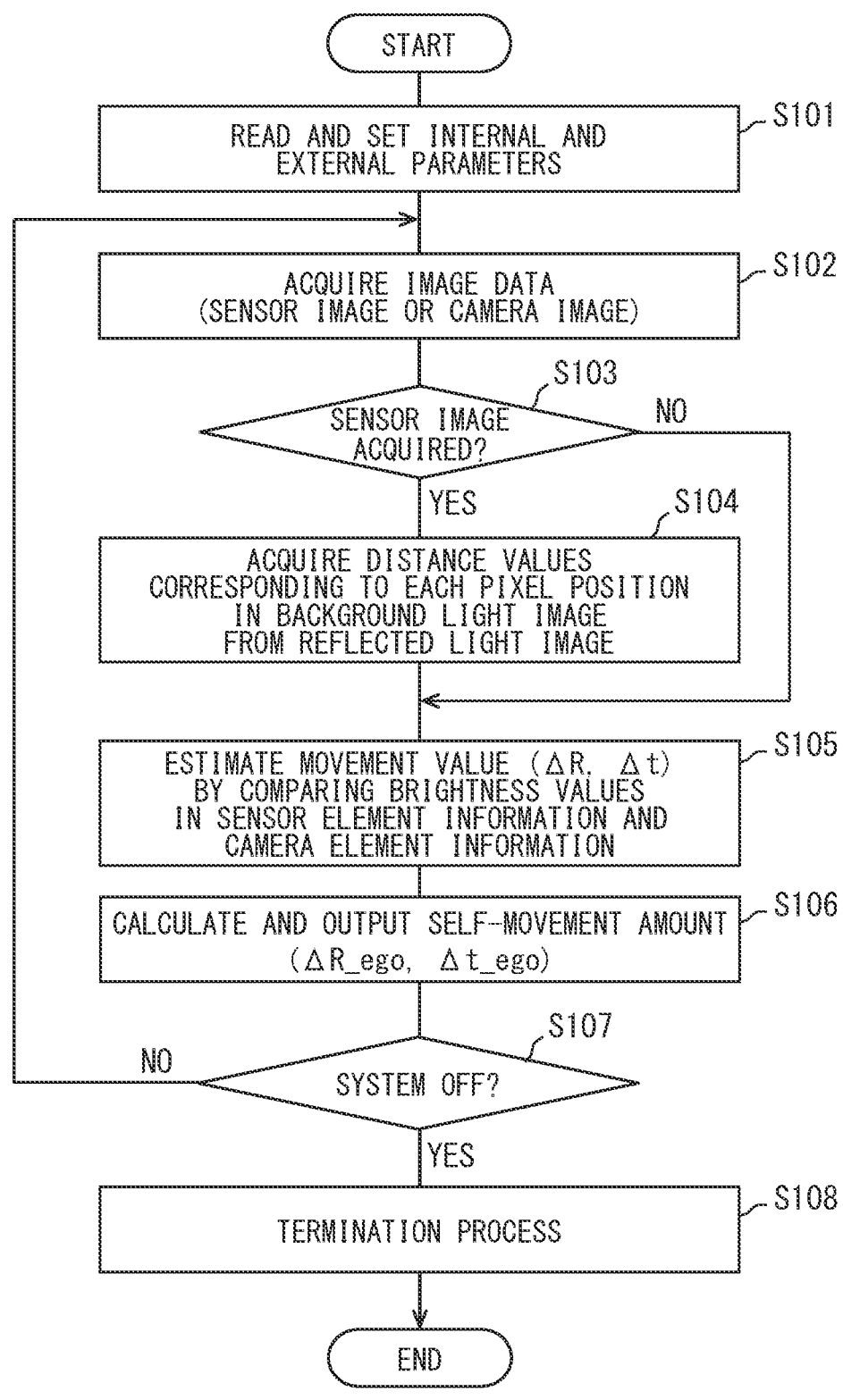
FIG. 6 is a flowchart of a movement amount estimation process in the image processing ECU.

The movement amount estimation method that realizes the self-movement amount estimation will be described below based on the flowchart shown in FIG. 6 with reference to FIGS. 1, 3, 5. The movement amount estimation process shown in FIG. 6 is started by the image processing ECU 30 after the initiation process is completed based on the power supply to each component of the automated driving system 110 from the power supply device 60.

In S101, the internal parameters and the external parameters related to the distance sensor 10 and the external camera 20 are read out from the storage unit 33 and stored to regions referenceable by the RAM 32, and the process proceeds to S102. In S102, the image data is acquired from one of the distance sensor 10 and the external camera 20, and the process proceeds to S103. In S102, the reflected light image ImR and the background light image ImL captured at substantially the same time are acquired from the distance sensor 10, or the camera image ImC is acquired from the external camera 20.

In S103, it is determined whether the image acquired in S102 is the sensor image ImS from the distance sensor 10. When it is determined in S103 that the camera image ImC is acquired from the external camera 20, the process proceeds to S105. In contrast, when it is determined in S103 that the sensor image ImS is acquired from the distance sensor 10, the process proceeds to S104.

In S104, the matching process for the reflected light image ImR and the background light image ImL generated in the same coordinate system is performed to acquire the distance value of the reflected light image ImR corresponding to each pixel position of the background light image ImL. In S104, the sensor element information containing the distance value and the luminance value of the feature point Fpa related to the captured object PO is prepared, and the process proceeds to S105.

In S105, the sensor element information prepared using the background light image ImL and the reflected light image ImR is compared with the camera element information prepared using the camera image ImC. When the camera image ImC is acquired in immediately preceding S102, the sensor element information prepared in past S104 is read out and compared with the camera element information prepared using the current camera image ImC. In contrast, when the sensor image ImS is acquired in immediately preceding S102, the sensor element information prepared in immediately preceding S104 is compared with the camera element information based on the latest camera image ImC acquired in past S102. In S105, the movement amounts $\Delta R$, $\Delta t$ are estimated by comparing the luminance value of the each element information based on the above formula 1 using the camera element information as the reference, and the process proceeds to S106.

In S106, based on the above formula 2, the self-movement amounts $\Delta R\_ego$, $\Delta t\_ego$ are calculated by eliminating the external parameters from the movement amounts estimated in S105. In S107, the estimated latest self-movement amounts are output to the automated driving ECU 50, for example, and the process proceeds to S107.

In S107, it is determined whether the automated driving system 110 is turned off. When it is determined in S107 that the system continues operating, the process returns to S102 to continuously estimate the self-movement amount. In contrast, when it is determined in S107 that the system is turned off, the process proceeds to S108. In S108, the termination process for the sensor package 100 is performed, and the movement amount estimation process ends.

In the first embodiment described above, the background light image ImL and the camera image ImC are used for the estimation of the movement amount of the estimation target ET in addition to the reflected light image ImR. Accordingly, the movement amount can be estimated with a higher frame rate compared with a case where the movement amount is estimated only from the reflected light image ImR. Accordingly, the accuracy in the estimation of the movement amount can be easily secured.

In the first embodiment, the texture information of the captured object PO based on the luminance values of the background light image ImL and the camera image ImC is used for estimating the movement amount in addition to the shape information of the captured object PO based on the distance value of the reflected light image ImR. Accordingly, the image processing ECU 30 can accurately estimate the movement amount of the estimation target ET even in a scene where there are few stationary three-dimensional structures in each measurement ranges MA1, MA2.

In the first embodiment, the vehicle A on which the light receiving element 12a and the camera element 22a is the estimation target ET, and the self-movement amount calculation unit 46 is configured to estimate the self-movement amount of the vehicle A. Since the frame rate is increased by the combination of the sensor image ImS and the camera image ImC as described above, the self-movement amount can be estimated with a high accuracy even when the estimation target ET is the vehicle A.

Further in the first embodiment, the shutter start timing Tf for generating the reflected light image ImR and the background light image ImL is offset from the shutter start timing Te of the camera image ImC. Accordingly, the successive sensor image ImS and the camera image ImC are images acquired in states where the position of the estimation target ET are different from each other. Accordingly, the effect of increasing the accuracy in the estimation of the movement amount due to the increase of the frame rate can be obtained securely.

Further, in the first embodiment, the entire frame period of the light receiving element 12a is offset from the entire exposure period of the camera element 22a. Since the frame period and the exposure period are largely offset from each other, the periods do not overlap, and accordingly the interval for acquiring the images by the image processing ECU 30 can be stable. As a result, a fluctuations in the accuracy of the estimation of the movement amount can be suppressed, and the accuracy of the estimation can be stably maintained.

In the first embodiment, the sensor element information related to the captured object PO and prepared using the sensor image ImS is compared with the camera element information related to the captured object PO and prepared using the camera image ImC. Since the pixels related to the captured object PO are compared instead of comparing all pixels of the image data, the image processing block 42 can estimate the movement amount faster.

In the first embodiment, the sensor element information is converted to information comparable with the camera element information by applying the conversion function W. The movement amount estimation unit 45 is configured to estimate the movement amount by comparing the luminance value contained in the sensor element information with the luminance value contained in the camera element information using the camera element information as the reference. As described above, in the calculation of the difference between the images for estimating the movement amount, the luminance value commonly contained in the images ImS, ImC is mainly used. That is, a process for generating values from the camera element information to be compared with the distance values of the sensor element information is not performed. As a result, the load for the calculation required for estimating the movement amount can be reduced.

In the first embodiment, the distance value of the reflected light image ImR is used in addition to the luminance value of the background light image ImL for identifying the captured object PO and the feature points Fpa in the sensor image ImS. Accordingly, even when the resolution of the sensor image ImS is low relative to the camera image ImC, the position of the pixel whose luminance value is to be compared can be accurately set in the sensor image ImS. As a result, the accuracy of the movement amounts $\Delta R$, $\Delta t$ estimated by the gradient method can be secured.

In the first embodiment, the distance sensor 10 corresponds to a distance measuring device, the external camera 20 corresponds to a camera device, and the image processing ECU 30 corresponds to a computing device and the movement amount estimation device. The processing unit 31 corresponds to a processor, the image processing block 42 corresponds to an estimation unit, the vehicle A corresponds to a moving body, and the sensor package 100 corresponds to a movement amount estimation system.

Second Embodiment

Figure 7:
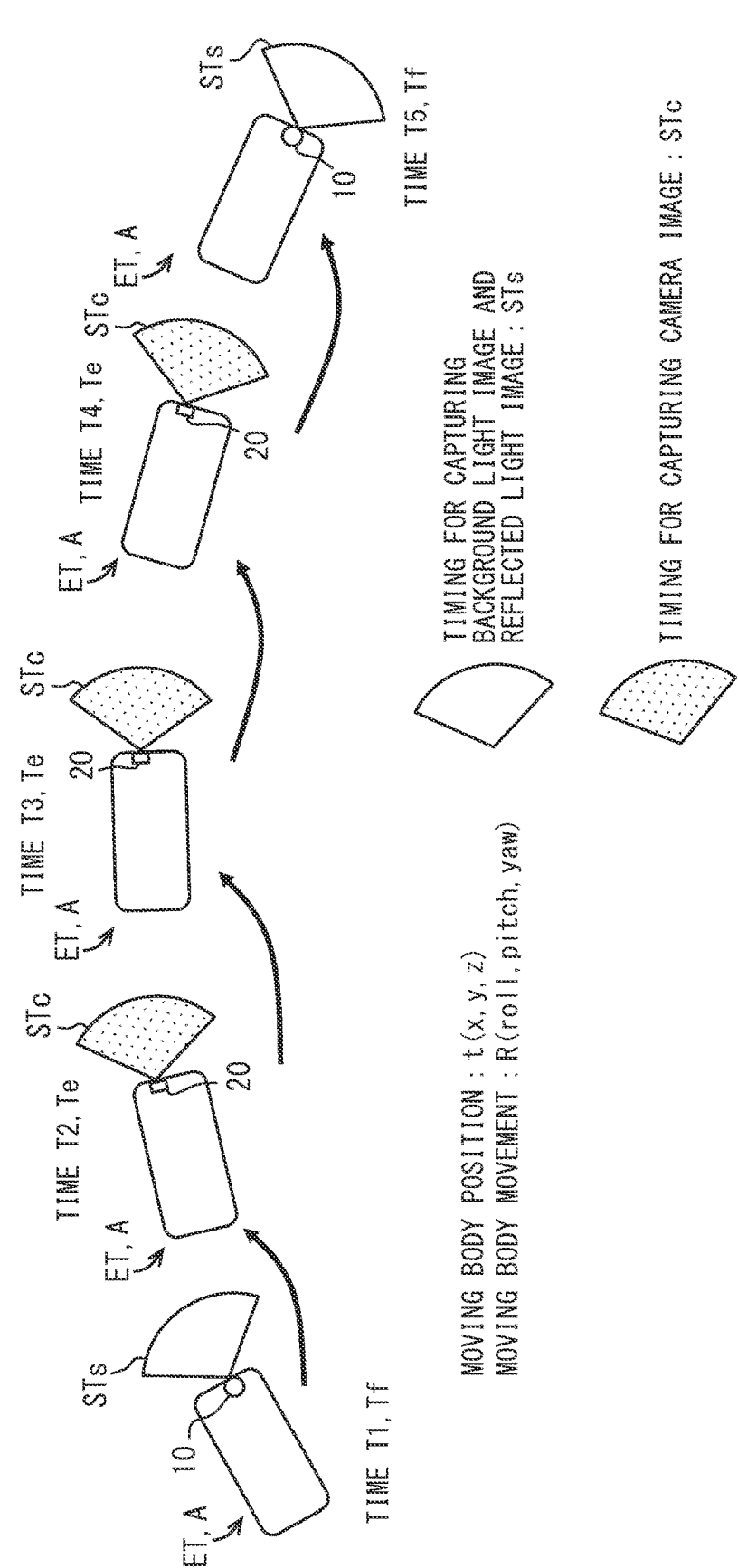
FIG. 7 is a diagram illustrating a timing for capturing a sensor image and a camera image according to a second embodiment.

In a second embodiment shown in FIG. 7, the shooting cycle of the external camera 20 for the camera image ImC is different from the shooting cycle of the distance sensor 10 for the sensor image ImS. Specifically, the frame rate of the camera image ImC is higher than the frame rate of the sensor image ImS. For example, in the second embodiment, the frame rate of the camera image ImC is about three times the frame rate of the sensor image ImS. The capturing timing STc of the camera image ImC comes three times (times T2, T3, T4) between the time T1 and the time T5 when the capturing timing STs of the sensor image ImS. As shown in FIGS. 3, 7, the image acquiring unit 41 is configured to acquire, in order, the sensor image ImS at the time T1 from the distance sensor 10, the camera image ImC at the time T2-T4 from the external camera 20, and the sensor image ImS at the time T5 from the distance sensor 10.

The image processing block 42 is configured to estimate the movement amount using the combination of the sensor image ImS and the camera image ImC, and estimate the movement amount using the successive camera images ImC. Specifically, when the image processing block 42 acquires the camera images ImC at the times T2-T4, the image processing block 42 combines the camera images ImC with the latest sensor image ImS (at the time T1) and estimates the movement amount. Further, at the times T3, T4, the image processing block 42 combines the latest camera image ImC with the camera image ImC of the precedent frame to estimate the movement amount.

Moreover, when the image processing block 42 acquires the sensor image ImS, the image processing block 42 may compare the acquired sensor image ImS with each of the camera images ImC to estimate the movement amount. Specifically, when the image processing block 42 acquires the sensor image ImS at the time T5, the image processing block 42 compares the acquired sensor image ImS with the camera image ImC for the time T4 and the camera image ImC for the time T3. The image processing block 42 is configured to integrate the results of the comparisons to estimate the movement amount.

According to the second embodiment, the same effects as the first embodiment can be obtained. Further, since the movement amount is estimated with the high frame rate, the accuracy in the estimation can be secured. Further, in the second embodiment, when it is considered that multiple frames are composed of the camera images ImC and the sensor images ImS, the luminance values are compared not only between successive frames, but also between frames skipped by one. According to this process, the accuracy in the estimation of the movement amount can be easily secured.

OTHER EMBODIMENTS

Although the embodiments of the present disclosure have been described above, the present disclosure should not be understood as being limited to the aforementioned embodiments. The present disclosure can be applied to various embodiments and various combinations thereof, without departing from the spirits of the present disclosure.

In a first modification example of the above-described embodiments, the frame rate of the distance sensor 10 is higher than the frame rate of the external camera 20. In a second modification example, the frame rates of the distance sensor 10 and the external camera 20 are variable. As in the first or second modification example, the frame rates of the distance sensor 10 and the external camera 20 can be changed as appropriate.

Further, the shutter start timing Tf of the sensor image ImS and the shutter start timing Te of the camera image ImC do not have to be offset at all the capturing timings STs, STc. That is, when the frame rates of the distance sensor 10 and the external camera 20 are different from each other, the shutter start timings Tf, Te may accidentally coincide with each other. In a third modification example, the image processing block 42 grasps the shutter start timings Tf, Te of the images ImS, ImC, and suspends the comparison of the luminance values of these images when the start timings Tf, Te are substantially the same.

In this case, an image set of the sensor image ImS and the camera image ImC, in which the frame period and the exposure period are entirely offset from each other and one of the frame period and the exposure period has the start timing close to the end timing of the other one, is suitable for the movement amount estimation. When the frame rates are different, the image processing block 42 may select the suitable image set described above and perform the movement amount estimation.

In a fourth modification example of the above-described embodiments, the distance sensor 10 and the external camera 20 are fixed to a stationary structure. The image processing block 42 is configured to the movement amount of the estimation target ET that is the captured subject PO commonly detected in the sensor image ImS and the camera image ImC. As in the fourth modification example, the estimation target ET is not limited to the moving body itself such as the vehicle A. Further, the distance sensor 10 and the external camera 20 may be disposed on the non-moving structure.

The image processing block 42 of a fifth modification example accurately grasps the shutter start timing Tf and the frame period of the distance sensor 10 and the shutter start timing Te and the exposure period of the external camera 20. The image processing block 42 is configured to estimate own translational movement amount Δt_ego, and then calculate the moving speed of the vehicle A that is the moving body using the difference between the shutter start timings Tf, Te. That is, the image processing block 42 has the moving speed estimation function in addition to the movement amount estimation function. When the image processing block 42 does not have the function of calculating the moving speed, the image processing block 42 does not have to accurately grasp the shutter start timings Tf, Te.

The image processing block 42 of a sixth modification example is configured to estimate the current position of the vehicle A by integrating the movement amount from a specific reference point (for example, a movement start point). That is, the image processing block 42 may have the position estimation function in addition to the movement amount estimation function.

In the above-described embodiments, the sensor element information containing the distance value and the luminance value by combining the pixel information of the reflected light image ImR and the background light image ImL captured at substantially the same time. Then, the movement amount is estimated by converting the sensor element information with the conversion function W and comparing it with the camera element information.

In a seventh modification example of the above-described embodiments, the image processing block 42 compares the reflected light image ImR with the camera image ImC and compares the background light image ImL with the camera image ImC individually. The image processing block 42 is configured to estimate the movement amount by integrating the comparison results. As described above, the specific process for estimating the movement amount using the reflected light image ImR, the background light image ImL, and the camera image ImC may be changed appropriately. In addition, the reflected light image ImR and the background light image ImL do not have to be captured at substantially the same time. Further, the conversion function may be applied to the luminance value of the camera image ImC to be comparable with the distance value of the reflected light image ImR. That is, the movement amount estimation process using the sensor image ImS as the reference may be performed.

In an eighth modification example of the above-described embodiment, the distance sensor 10 constitutes a sensor unit integrated with an external camera 20, for example. In a ninth modification example, the sensor unit and the image processing ECU 30 may be integrated with each other to be a sensor package unit. Further, in a tenth modification example, the functions of the image processing ECU 30 and the automated driving ECU 50 are implemented on one integrated control ECU. In an eleventh modification example, at least a part of the process related to the movement amount estimation by the image processing ECU 30 is performed by a computer provided on a network. In this eleventh modification example, the result of the movement amount estimation is provided to the automated driving ECU 50 of the vehicle A through the network.

In a twelfth modification example of the above-described embodiments, multiple distance sensors 10 or multiple external cameras 20 sequentially output the image data to the image processing ECU 30. The image processing ECU 30 can perform the movement amount estimation by combining images containing a common captured object PO from the acquired image data. As in the twelfth modification example, if the same captured object can be detected, the measurement ranges do not have to overlap with each other. The measurement ranges of the distance sensor 10 and the external camera 20 are not limited to the front range of the vehicle A, but may be a side range or a rear range.

The distance sensor 10 of a thirteenth modification example is a non-scanning type LiDAR device that does not include the movable optical member such as a polygon mirror. In such LiDAR device, the reflected light image ImR and the background light image ImL may be captured by a global shutter method. The external camera 20 of a fourteenth modification example is configured to output a gray scale image as the camera image ImC instead of the color image. Such camera image ImC may be captured by a rolling shutter method. In an fifteenth modification example, autonomous sensors such as a radar device and a sonar device are electrically connected with the image processing ECU 30 in addition to the distance sensor 10 and the external camera 20. The image processing ECU 30 can estimate the self-movement amount by combining the detection results by each device.

In the above-described embodiment, the respective functions provided by the image processing ECU 30 can be also provided by software and hardware for executing the software, only software, only hardware, and complex combinations of software and hardware. In cases where functions are provided by electronic circuits as hardware, the functions can be also provided by analog circuits or digital circuits which include a large number of logic circuits.

Further, the form of the storage medium (continuous tangible computer reading medium, non-transitory tangible storage medium) for storing an image processing program or the like that can realize the above image processing method may be changed as appropriate. For example, the storage medium is not limited to the configuration provided on the circuit board, and may be provided in the form of a memory card or the like. The storage medium may be inserted into a slot portion, and electrically connected to the control circuit of the image processing ECU 30. Further, the storage medium may be an optical disk or a hard disk as a copy base of the program of the image processing ECU 30.

The control unit and the method thereof which have been described in the present disclosure may be also implemented by a special purpose computer which includes a processor programmed to execute one or more functions implemented by computer programs. Alternatively, the apparatus and techniques described in this disclosure may be implemented by dedicated hardware logic. Alternatively, the device and the method described in the present disclosure may be implemented by one or more special purpose computers configured by a combination of a processor executing a computer program and one or more hardware logic circuits. The computer program may also be stored in a computer-readable non-transitory tangible storage medium as instructions to be executed by a computer.

What is claimed is:

1. A movement amount estimation device comprising:
an image acquiring unit configured to acquire a reflected light image, a background light image, and a camera image, the reflected light image containing distance information obtained by emitting light and detecting the light reflected from an object by a light receiving element, the background light image containing luminance information obtained by detecting background light relative to the light reflected from the object by the light receiving element, the camera image being captured by a camera element that is different from the light receiving element; and an estimation unit configured to estimate a movement amount of an estimation target using information of a captured object commonly detected in the reflected light image, the background light image, and the camera image, wherein
the estimation unit is configured to estimate a movement amount of the captured subject by comparing sensor element information with camera element information which are related to the captured object, the sensor element information being prepared using the reflected light image and the background light image, the camera element information being prepared using the camera image.

2. The movement amount estimation device according to claim 1, wherein
the estimation unit is configured to estimate the movement amount of a moving body as the estimation target in which the light receiving element and the camera element are mounted.

3. The movement amount estimation device according to claim 1, wherein
a start timing of a detection period when the light receiving element performs a detection for generating the reflected light image and the background light image is offset from a start timing of an exposure period when the camera element performs an exposure for capturing the camera image.

4. The movement amount estimation device according to claim 3, wherein the detection period is entirely offset from the exposure period.

5. The movement amount estimation device according to claim 1, wherein
the estimation unit is configured to estimate the movement amount of the captured object by comparing a luminance value contained in the sensor element information with a luminance value contained in the camera element information.

6. The movement amount estimation device according to claim 1, wherein
the information of the captured object contains information of a plurality of feature points related to the captured object.

7. The movement amount estimation device according to claim 6, wherein
the estimation unit is configured to
calculate a motion vector of the captured object by tracking the plurality of feature points, and
estimate the movement amount of the estimation target from the a movement amount of the captured object in the images.

8. A method for estimating a movement amount, the method comprising:
acquiring a reflected light image, a background light image, and a camera image, the reflected light image containing distance information obtained by emitting light and detecting the light reflected from an object by a light receiving element, the background light image containing luminance information obtained by detecting background light relative to the light reflected from the object by the light receiving element, the camera image being captured by a camera element that is different from the light receiving element; and
estimating the movement amount of an estimation target using information of a captured object commonly detected in the reflected light image, the background light image, and the camera image, wherein a movement amount of the captured subject is estimated by comparing sensor element information with camera element information which are related to the captured object, the sensor element information being prepared using the reflected light image and the background light image, the camera element information being prepared using the camera image.

9. A computer program product stored on at least one non-transitory computer readable medium and comprising instructions configured to, when executed by at least one processor, cause the at least one processor to:

acquire a reflected light image, a background light image, and a camera image, the reflected light image containing distance information obtained by emitting light and detecting the light reflected from an object by a light receiving element, the background light image containing luminance information obtained by detecting background light relative to the light reflected from the object by the light receiving element, the camera image being captured by a camera element that is different from the light receiving element; and estimate a movement amount of an estimation target using information of a captured object commonly detected in the reflected light image, the background light image, and the camera image, wherein a movement amount of the captured subject is estimated by comparing sensor element information with camera element information which are related to the captured object, the sensor element information being prepared using the reflected light image and the background light image, the camera element information being prepared using the camera image.

10. A movement amount estimation system comprising:

a distance measuring device configured to generate a reflected light image containing distance information obtained by emitting light and detecting the light reflected from an object by a light receiving element, and a background light image containing luminance information obtained by detecting background light relative to the light reflected from the object by the light receiving element;

a camera device configured to generate a camera image by capturing by a camera element that is different from the light receiving element; and a computing device configured to estimate a movement amount of an estimation target using information of a captured object commonly detected in the reflected light image, the background light image, and the camera image, wherein the computing device is configured to estimate a movement amount of the captured subject by comparing sensor element information with camera element information which are related to the captured object, the sensor element information being prepared using the reflected light image and the background light image, the camera element information being prepared using the camera image.

* * * * *